United States Patent Office 3,439,403
Patented Apr. 22, 1969

3,439,403
MAGNETOFORM METHOD ASSEMBLY DEVICE
Hans Joachim Lippmann, Boxdorf, Erhard Prölss, Katzwang, and Horst Schenk, Erlangen, Germany, assignors to Siemens Aktiengesellschaft, Berlin-Siemensstadt, Germany, a corporation of Germany
Filed June 20, 1966, Ser. No. 558,866
Claims priority, application Germany, July 13, 1965, S 98,152
Int. Cl. H02k 15/00
U.S. Cl. 29—205                          4 Claims

ABSTRACT OF THE DISCLOSURE

Device for adjusting the axial play and operative air gap in a magnetoform method of assembling electric motors includes a removable jig of insulating material formed with bores for air gap needles and disposed against one end of a metallic hollow cylinder acting as field concentrator, and there is disposed against the other end of the cylinder, a ribbed bearing plate holder of insulating material for supporting a motor stator, and screw means extending through the holder and operative for adjustably moving the rotor shaft of the motor.

---

Figure 1:
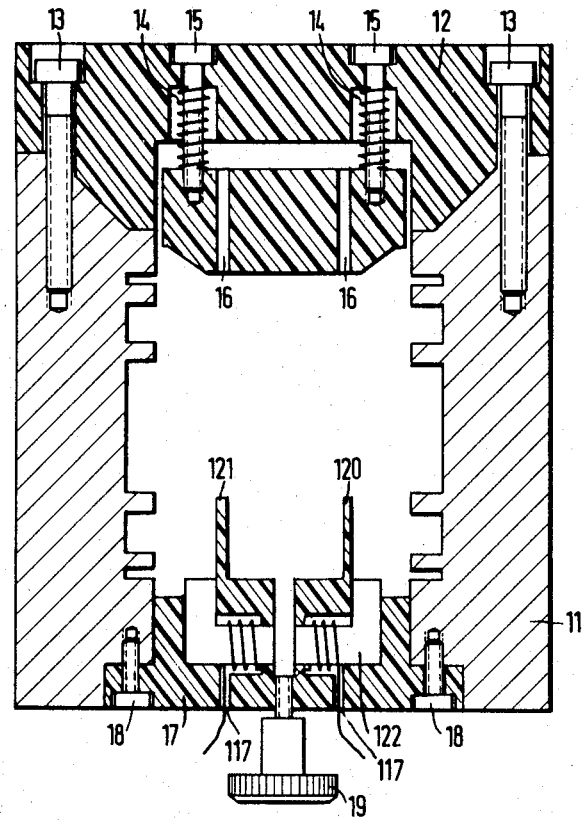

Our invention relates to the forming of metal workpieces by the magnetoform method. More particularly, it relates to a device suitable for use in magnetic forming apparatus for adjusting the axial play and the operative air gap in the assembly of such devices as miniature electric motors by a magnetoform method.

Of late, there have been developed novel methods in the field of metal workpiece formation which enable much higher forming speeds than had been previously achieved by the older, conventional workpiece forming methods. In a particularly efficacious high speed forming method, i.e., one in which there are employed strong pulsating magnetic fields, compression coils, expansion coils and flat coils are employed. In this latter method, also referred to as the magnetoform method, a capacitor is discharged through a workpiece forming coil within which a workpiece to be formed is located. The alternating current in the oscillating circuit provided by the capacitor produces a magnetic field which varies with respect to time. The latter field in turn produces eddy currents in the metal workpiece located within the workpiece forming coil. The action of the force between the magnetic field and the eddy currents may be utilized to form the workpiece and pressures can be obtained thereby of up to several thousand kp./cm.² at forming speeds of several hundred meters per second. Such magnetoform method is also suitably employed in the assembly of small electric motors.

In the assembly of such motors by the magnetoform method, the individual components of the motor have to be disposed with respect to each other in positions which are necessary for the functioning of the motor when it is finally assembled, such disposing being suitably effected with an appropriate positioning device. Only at this juncture can the individual components be fixed in their respective proper dispositions by the compression of an encasing tube.

An important object of this invention is to provide a device for adjusting the axial play and the operative air gap during the assembly of small electric motors by the magnetoform method.

This object is achieved by providing one surface of a metallic hollow cylinder which functions as a field concentrator and has a chosen internal profile with a removable jig comprising an insulating material and having bores for receiving air gap needles. An opposite surface is provided with an adjusting screw which acts upon the axis of the motor rotor, and a ribbed bearing plate holder comprised of an insulating material.

The bearing plate holder may be a mechanical type holder such as, for example, one having hooks which pass through bores in the holder and hook into the air opening of the bearing plate. In addition, the bearing plate holder may be securely maintained, for example, by the creating of an underpressure between the bearing plate and a lower mounting plate, bores being provided to enable the pumping off of air to achieve such underpressure. To securely maintain a bearing plate made of iron, for example, the bearing plate holder may be provided with an electromagnet.

In accordance with the invention, there is provided a device for adqusting the axial play and operative air gap in the magnetoform method of the assembly of electric motors comprising a metallic hollow cylinder having a predetermined internal profile for containing therein the individual components of the motor to be assembled in chosen respective dispositions relative to each other, the cylinder functioning as the magnetic field concentrator in the apparatus. A jig is provided which comprises an insulating material tensionally disposed against one end of the cylinder, bores within the jig being provided for receiving therein air gap needles to vary the operative air gap.

There is further included a motor lower bearing plate holder comprising an insulating material disposed against the other end of the cylinder and having ribs extending into the interor of the cylinder for supporting the stator component of the motor, the rotor component being contained within the stator component. Screw means are provided which threadedly extends through the lower bearing plate holder and which are operative to move the shaft of the rotor, the device being adapted to be connected to a pulse source for assembling the motor by the magnetoform method.

The foregoing and more specific objects and features of our invention will be apparent from, and will be mentioned in, the following description of a magnetoform method assembly device according to the invention shown by way of example in the accompanying drawing.

Figure 2:
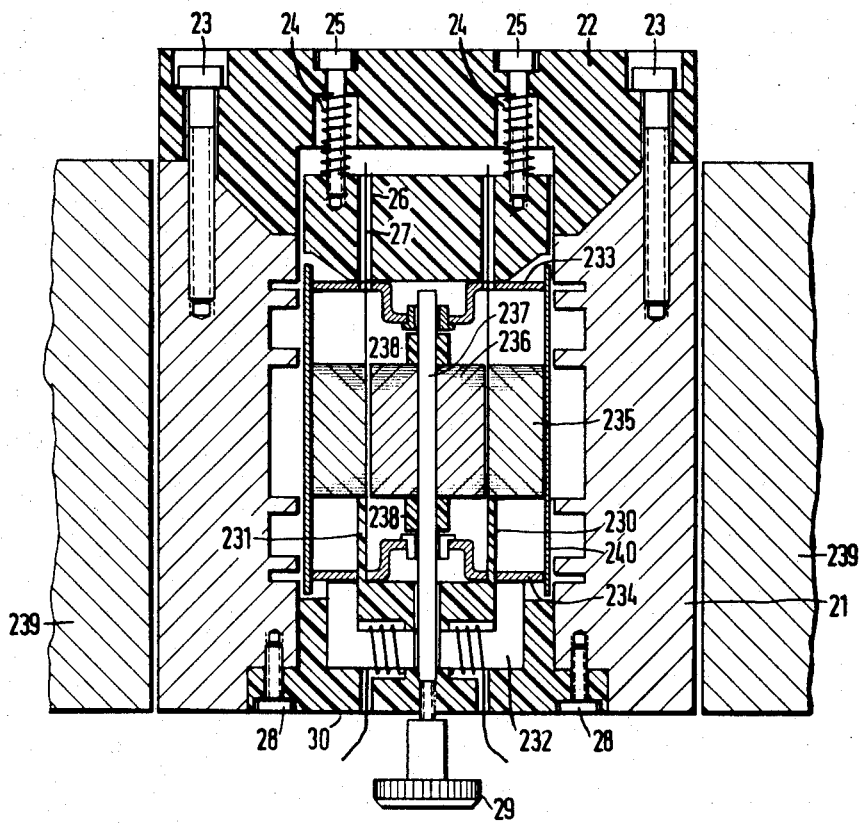

In the drawing, FIG. 1 is a view partly in section of an illustrative embodiment of a device constructed in accordance with the principles of the invention; and FIG. 2 is a view similar to that of FIG. 1 and which further shows the appropriately positioned components of a motor to be assembled, contained in the device.

Referring now to FIG. 1 wherein there is shown a partly sectional view of an illustrative embodiment of a device constructed in accordance with the invention, a metallic hollow cylinder 11 suitably of copper beryllium, and having a chosen internal profile has pressed against one surface thereof, a jig 12 which suitably comprises an insulating material such as a hard plastic. Jig 12 is forced against cylinder 11 by a bayonette catch and by means of holding bolts 13. Pressure springs 14 are provided which bear against a bearing plate of insulating material and which is disposed in opposed spaced relationship with jig 12, the spring pressure of springs 14 being adjustable with the aid of bolts 15. Bores 16 are provided for receiving air gap needles therein.

The structure designated by the numerals 17 is a bearing plate holder which is maintained in its proper disposition by fastening bolts 18, an adjusting screw 19 also being provided as shown. The structures 120 and 121 constitute ribs of an insulating material and structure 122 is an electromagnet.

As seen in FIG. 1, bearing plate holder 17 also consists of an insulating material and carries the electromagnet 122. Ribs 120 and 121 on bearing plate holder 17 support the stator of the motor to be mounted. Screws 18 serve to fasten bearing plate holder 17 at the end face opposite to the jig receiving face of hollow cylinder 11. Adjusting screw 19 in bearing plate holder 17 enables the displacing of the rotor axis of the motor to be assembled whereby there is adjusted the axial play of the rotor axis which is necessary for the functioning of the motor. During the displacing of the rotor axis by the action of the adjusting screw, lower bearing plate 17 is simultaneously maintained in its position by electromagnet 122 while the upper bearing plate is raised through the compression of jig 12 to produce a split between the lower bearing and the lower distance piece whose height is equal to that of the required axial play.

In FIG. 2 wherein there is shown a schematic illustration of a device according to the invention arranged within a magnetoforming coil and the arrangement inside of the device of the individual components of a miniature motor to be assembled, the structure designated by the numeral 21 depicts a hollow metal cylinder against one end of which there is provided a jig 22 which suitably consists of an insulating material. The bolts 23 in FIG. 2 correspond to bolts 13 in the depiction of FIG. 1 and function as a bayonette catch or latch. The springs 24 and their associated respective bolts 25 for variably adjusting the pressure of springs 24 bear against a bearing plate 233 which is disposed in apposition to and spaced from jig 22. The bores 26 are provided for receiving air gap needles 27 therein.

The fastening bolts 28 cooperate with a lower bearing plate holder 30 and an adjusting knob 29 is provided for displacing the rotor axis of the motor to be assembled. The ribs 230 and 231 as the ribs 120 and 121 in FIG. 1, support the stator of the motor to be assembled and an electromagnet 232 is provided for maintaining the lower bearing plate 234 of the motor in position. Structure 233 constitutes the upper bearing plate of the motor. The other structures contained within cylinder 21 are the motor stator 235, the motor rotor 236, the motor shaft 237 and the spacers 238. A coil 239 functions as the compression coil and structure 240 is a tubular jacket for the motor.

The assembly of the individual components of the motor into the assembled motor is carried out in hollow metallic cylinder 21 which also functions as a field concentrator. Cylinder 21 is provided with an appropriate inner profile for producing a predetermined form of tubular jacket 240 and for properly fixing in position the individual components of the motor. The field concentrator 21 is disposed within compression coil 239.

In the magnetoform method of assembling the motor according to the invention, the tubular jacket or housing 240 is inserted into cylinder 21. Next, there is placed within housing 240 the lower bearing plate 234 and the stator 235, the latter being supported by ribs 230 and 231. Then, the rotor 236 upon whose shaft 237 there rests the upper bearing plate 233 is inserted. With the aid of jig 22, the bearing plates are pressed against spacers 238 which are provided at the rotor shaft whereby in this condition the motor has no axial play, the position of jig 22 being determined by springs 24 which are maintained in a tensioned position by a bayonette catch. In order to adjust the axial play necessary for the functioning of the motor, lower bearing plate 234 is maintained in its position by a bearing plate holder 30 which is provided with an electromagnet 232. Adjusting knob 29 is employed to lift the rotor shaft 237 and upper bearing plate 233 by compression of jig 22. Such action causes a crack to occur between the lower bearing and the lower spacer whose height is equal to the required axial play. The air gap needles 27 are employed to vary the operative air gap. For this purpose, jig 22 is provided with bores 26 which receive air gap needles 27.

It is of course to be realized that the magnetoforming assembly method is carried out using a strong current pulse source such as a voltage source and an associated capacitor bank, for example. Since such pulse sources are well known in the art, they have not been included in the drawing.

To enable a further securing of the lower bearing plate holder, bores 117, as shown in FIG. 1, may be provided for exhausting air therefrom.

It will be obvious to those skilled in the art upon studying this disclosure that magnetoform method motor assembly devices according to our invention permit of a great variety of modifications and hence can be given embodiments other than those particularly illustrated and described herein without departing from the essential features of the invention and within the scope of the claims annexed hereto.

We claim:

1. A device for adjusting the axial play and the operative air gap in a magnetoform method of the assembly of electric motors comprising a metallic hollow cylinder having a predetermined internal profile for containing therein the individual components of said motor to be assembled in chosen respective dispositions relative to each other, said cylinder functioning as the magnetic field concentrator, a jig comprising an insulating material tensionally disposed against one end of said cylinder, bores within said jig for receiving therein air gap needles to vary said operative air gap, a motor lower bearing plate holder comprising an insulating material disposed against the other end of said cylinder and having ribs extending into the interior of said cylinder for supporting the stator component of said motor, the rotor component of said motor being contained within said stator component, and screw means extending through said holder and operative to adjustably move the shaft of said motor, said device being adapted to be connected to a pulse source for assembling said motor by said magnetoform method.

2. A device as defined in claim 1 wherein the lower bearing plate component of said motor is disposed to rest against said holder and the upper bearing plate is disposed to rest on the shaft of said motor and against said jig and further including magnetic means contained with said lower bearing plate holder for fixedly maintaining in position the lower bearing plate of a motor to be assembled.

3. A device as defined in claim 1 wherein said lower bearing plate holder is provided with bores therethrough for exhausting air therefrom.

4. A device as defined in claim 1 wherein said jig is positionally maintained by a bayonette catch.

References Cited

UNITED STATES PATENTS

| | | | |
|---|---|---|---|
| 2,976,907 | 3/1961 | Harvey et al. | 72—56 |
| 3,002,261 | 10/1961 | Avila et al. | 29—596 |
| 3,141,236 | 7/1964 | Dunne et al. | |
| 3,220,103 | 11/1965 | Simons. | |
| 3,252,313 | 5/1966 | Eilers et al. | |
| 3,320,660 | 5/1967 | Otto | 29—596 |

FOREIGN PATENTS

| | | |
|---|---|---|
| 1,239,719 | 7/1960 | France. |
| 1,379,264 | 10/1964 | France. |
| 1,137,124 | 9/1962 | Germany. |

THOMAS H. EAGER, *Primary Examiner.*

U.S. Cl. X.R.

29—149.5, 200, 445, 596; 72—56